April 27, 1965 V. A. HINDS 3,181,007

AUTOMATIC CONTRAST CIRCUIT EMPLOYING TWO CASCADED DIFFERENCE AMPLIFIERS FOR CHANGING SLOPE OF INFORMATION SIGNAL

Filed Sept. 7, 1962 2 Sheets-Sheet 1

INVENTOR.
VIRGIL A. HINDS

BY John R. Manning
ATTORNEY

United States Patent Office 3,181,007
Patented Apr. 27, 1965

3,181,007

AUTOMATIC CONTRAST CIRCUIT EMPLOYING TWO CASCADED DIFFERENCE AMPLIFIERS FOR CHANGING SLOPE OF INFORMATION SIGNAL

Virgil A. Hinds, Farmers Branch, Tex., assignor to Sperry Rand Corporation, New York, N.Y., a corporation of Delaware Filed Sept. 7, 1962, Ser. No. 222,002
10 Claims. (Cl. 307—88.5)

Figure 1:
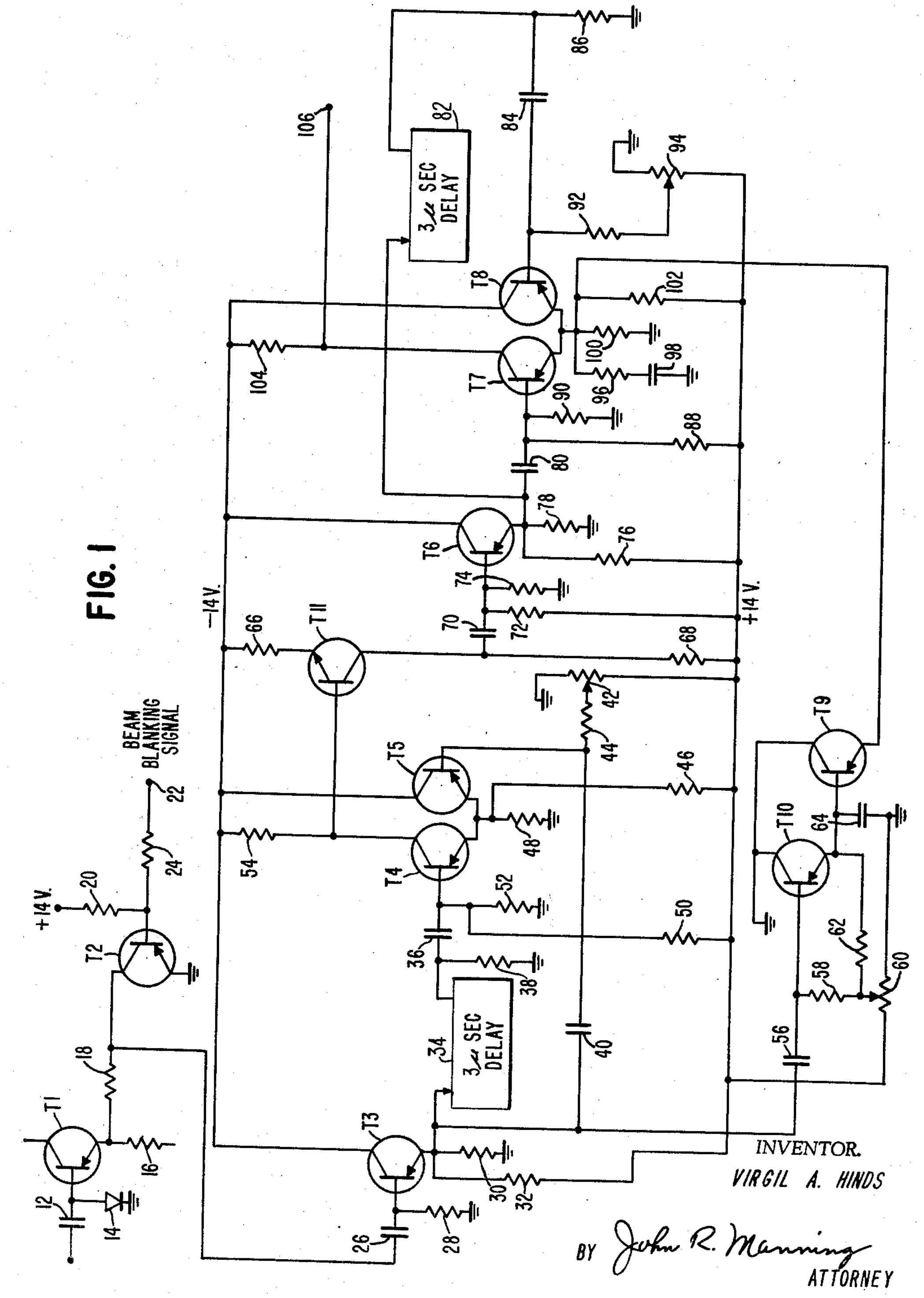
Figure 2:
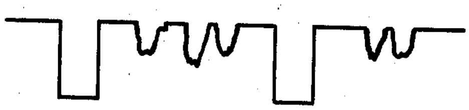

This invention relates to an automatic contrast control circuit and more specifically to a circuit for receiving the output signals from a video amplifier and processing the signals to derive the information contained therein.

Character recognition systems presently known employ a number of different scanning techniques for scanning the characters and deriving the characteristic output signals indicative or peculiar to the particular character scanned. One such character recognition system employs a television camera tube such as the vidicon type. Although the general principles employed in scanning a scene or picture for television transmission is similar to scanning a field of characters, the circuits utilized to interpret the video signals produced as a result of the scanning beam within the camera tube are quite different. In scanning a scene or picture for television transmission, the circuits coupled to the output of the camera tube must be capable of preserving the white signals, the black signals, and the various shades of gray that are found in normal scenes to be televised. In character recognition techniques, although the white signals, the black signals and the various shades of gray are still derived, the circuits utilized for character recognition techniques in the present invention must be capable, in certain instances, of making a decision whether a particular shade of gray is either more white than black or more black than white. While the characters are being scanned, spot sampling techniques are utilized for character identification by sampling the condition of the beam at certain positions with respect to time and determining only whether the spot so sampled would fall into the white category of signals or if the sample were gray enough to fall into the black category of samples. If for any reason it is desirable to retain the "gray" sample areas, the circuit will readily operate to indicate, by the amplitude of the information pulse, the gray as well as the black areas.

The characters may be anywhere from a dark color which contrasts greatly with the background to a very light color which tends to merge with the background. At other times both the background and the characters may vary in density at the same time. In many cases, contrast between the character and its background may be such as to permit an easy distinction to the human eye, but to the scanning beam of the camera tube the distinction may be only very slight. In order to match the ability of the human eye to detect these subtle contrasts, the automatic contrast control circuit of the present invention must be able to compensate for variations in the general density level of the data by making a decision for each spot that was sampled whether the sample point was either black or white, and excluding the various shades of gray. This does not mean that the various shades of gray in the sampling spot or area technique are excluded but are either directed to the character recognition interpreter circuits as a white sample spot or a black sample spot. Thus, the circuit must be able to indicate that the character lines are "black" and the background is "white" for overlapping ranges of viewed light.

Prior art circuits are known wherein electrical means may be employed to manually compensate for the degree of "darkness" between the characters and the background prior to the processing of a batch of documents. In addition, prior art circuits are known which will automatically compensate for the degree of "darkness" just mentioned by setting a voltage level which is utilized throughout the scan for an entire field of characters. The manual means are undesirable since the variations between the printing on the large number of documents will vary and thus provide a large group of rejected documents. Circuits wherein the contrast is automatically adjusted for the whole field are also undesirable since experience shows that the first character of the field may be lighter or darker than the remaining characters of the field. Thus, under this technique the reject rate could be kept low only if all characters of the field were of the same intensity, which is not the case in actual practice.

In the processing of invoices as produced by the well-known credit card or charge plate, experience shows that the characters within a given field will vary greatly in intensity since different machines have been used to produce the documents, different operators have operated the different machines, different credit plates have been used to produce the documents, and various qualities, grades and thicknesses of paper have been utilized to produce the invoices. Accordingly, it is desirable that an automatic contrast control circuit be utilized to receive the varying output signal from the camera tube, which contrast control circuit operates automatically, continuously, and for each scan of the scanning beam of the camera tube.

Accordingly, it is an object of the present invention to improve character scanning techniques.

It is a further object of the present invention to improve automatic contrast control circuits.

It is another object of the present invention to provide an automatic contrast control circuit capable of operating on a continuing basis for each scan of the scanning beam.

It is still another object of the present invention to provide a circuit which is capable of producing as much contrast between black and white signals as is practical.

Briefly, the automatic contrast control circuit of the present invention receives the video signal from a video amplifier such as the circuit disclosed in my copending application entitled "Video Amplifier," Serial No. 222,059, filed Sept. 7, 1962. Means are provided for removing the beam blanking signals, and the video pulse train, minus the beam blanking signals, is applied to an emitter follower circuit. The signal from the emitter follower is directed in two paths to a first difference amplifier. The difference amplifiers of the present invention may also be termed "differential switches." The first path is directly to one amplifier of the first difference amplifier or differential switch and the second path is through a delay line to the other amplifier of the first difference amplifier. The first difference amplifier will improve the information pulse by removing a portion of the sloping leading edge of the pulse and reproducing the leading edge as a substantially square wave. The output from the first difference amplifier is inverted and amplified and coupled to a second difference amplifier or differential switch composed of three principal elements or transistors. The first transistor of the second difference amplifier receives the inverted and amplified signal from the first difference amplifier; the second transistor of the second difference amplifier receives a delayed signal; and, the third transistor of the second difference amplifier receives the original signal from the first emitter follower circuit. The second difference amplifier will improve the information pulse by changing the sloping trailing edge of the pulse to a more vertical waveform indicating a fast rise (or fall) time. Thus, the automatic contrast control circuit of the present invention provides as much contrast between black and white signals as is practical by operating separately on the leading edge and trailing edge of the information pulse and reproducing this pulse as a substantially square wave pulse.

Further features and objects of the invention will be found throughout the more detailed description and a better understanding of the invention will be afforded by the following detailed description considered in conjunction with the accompanying drawings in which:

FIGURE 1 is a schematic diagram of the present invention with certain elements thereof being illustrated in block form; and, FIGURES 2 through 9 show the waveforms at various points in the circuit.

As shown in the FIGURE 1, signals from a video amplifier (not shown) are applied to the base of a transistor T1 through a capacitor 12. The base of T1 is clamped to ground by a diode 14. The video signals applied to the base of T1 include the information pulses (of smaller amplitude) and the beam blanking pulses (of larger amplitude) such as those shown in the FIGURE 2. A negative voltage is applied to the collector of T1, for example −14 volts. The emitter T1 is coupled to a positive potential (for illustrative purposes +14 volts) through a resistor 16. The transistor T1 is coupled as an emitter follower through a resistor 18 to the collector of a transistor T2. The emitter of the transistor T2 is at ground potential and the base of T2 is biased at a positive voltage, such as +14 volts, through a resistor 20. Beam blanking signals are applied to the input 22, through a resistor 24 and to the base of T2. Signals applied to the input 22 will be effective to remove the beam blanking signals from the video pulse train and thus leave only the information pulses remaining. The transistor T2 and the application of the blanking signals to the input 22 are useful not only for removing the beam blanking pulses but are useful for blanking the video at any other time for any particular reason as desired.

The voltage developed across the resistor 18 is applied to the base of a transistor T3 through a capacitor 26. Since the beam blanking pulses have now been removed from the video signal, the signals applied to the base of T3 are those as shown at the FIGURE 3. The base of the transistor T3 is connected to ground through a resistor 28. The emitter of T3 is connected to ground through a resistor 30 and to a positive potential such as +14 volts through a resistor 32.

The output on the emitter of T3 goes into three paths: the first path is through a delay line 34 to a transistor T4 which comprises one of the transistors of the first difference amplifier; a second path is to a level setting potentiometer and to a transistor T5 which is the other transistor of the first difference amplifier; and, the third path is to a second level setting potentiometer and to an emitter follower transistor whose output is coupled to the transistor T9 which is one of the transistors of a second difference amplifier which comprises three transistors.

The function of the first difference amplifier is to operate on the leading edge of the information pulse by deriving a substantially vertical rise of the pulse from the sloping leading edge as presented to the first difference amplifier. The function of the second difference amplifier is to operate on the trailing edge of the video pulse by converting the sloping trailing edge to a substantially vertical trailing edge. Thus, the two difference amplifiers working in conjunction will convert the video pulse with its sloping, leading and trailing edges to a substantially square wave pulse form.

The specific circuitry from the emitter of T3 will now be described. The signal from the emitter of T3 is applied to the three microsecond delay line 34 and then to the base of the transistor T4 through a capacitor 36. The transistors T4 and T5 comprise the first difference amplifier. A resistor 38 is coupled between ground and the common junction of the delay line 34 and the capacitor 36.

The signal from the emitter of T3 is also coupled through a capacitor 40 to the base of T5 and to a potentiometer 42 through a resistor 44. The emitters of T4 and T5 are coupled together to form the difference amplifier and are connected to a positive potential through a resistor 46. In addition, the common emitters are connected to ground through a resistor 48. The base of T4 is connected to a positive potential through a resistor 50 and to ground through a resistor 52. The collector of T4 is coupled to a negative voltage through a resistor 54 and the voltage developed across the resistor 54 is applied to the base of an inverter transistor T11. Since only one output is to be derived from the first difference amplifier, the collector of T5 is coupled directly to the negative voltage as shown.

One side of the potentiometer 42 is connected to ground and the other side is coupled to the positive voltage. This arrangement of the potentiometer 42 provides an adjustable bias to the base of T5. Thus, the voltage at which T5 conducts may be manually adjusted by the potentiometer 42 during testing procedures.

As indicated earlier, the first difference amplifier or switch including the transistors T4 and T5 operates upon the leading edge of the video waveform to transform the leading edge from a sloping configuration into a vertical or substantially vertical rising (or falling) pulse. The signal current to the first difference amplifier through the resistors 46 and 48 is switched between T4 and T5 depending upon which of the bases of T4 and T5 is most negative. The base that is the most negative causes that transistor to conduct. The signal current through resistors 46 and 48 can be shared by T4 and T5 if neither base is sufficiently negative to completely control the emitter current. If the base of T5 is most negative, T4 will be turned off and no voltage will be developed across the resistor 54. If the signal at T4 is most negative, then a voltage depending upon the signal is developed across the resistor 54.

The signal from the emitter of T3 takes a third path to an emitter follower coupled transistor T10 and this path is to the base of T10 through a capacitor 56. The emitter of the transistor T10 is directed to the base of a transistor T9 which is one of the transistors forming the second difference amplifier or switch. The second difference amplifier includes the transistors T7, T8, and T9, which transistors have their emitters coupled in common or to the same point.

The base of the transistor T10 is connected to a positive voltage through a resistor 58 and to the wiper arm of the potentiometer 60. One side of the potentiometer 60 is connected to a positive voltage and the other side is connected to ground. In addition, a resistor 62 is connected between the emitter of T10 and the wiper arm of the potentiometer 60. The transistor T10 operates in an emitter follower relation and is coupled to the base of the transistor T9. Also coupled to the emitter of T10 and the base of T9 is a capacitor 64 whose other side is connected to ground. The collectors of T9 and T10 are connected to ground as shown. In the arrangement shown, the potentiometer 60 is capable of adding a fixed D.C. bias which is determined by the setting of the potentiometer 60 and which voltage is to be added to the voltage which is supplied by the emitter of T10. Signal peaks on the base of T10 cause the peak negative voltages of the waveform to be stored on the capacitor 64. The voltage on the base of T9 controls the voltage at which T9 conducts. To be hereinafter described, if the voltages on the bases of T8 and/or T9 become more negative than the voltage on the base of the transistor T7, the transistor T7 switches off. If the base of the transistor T7 is more negative than the voltage on the bases of T8 and/or T9, then T7 conducts according to the signal applied to its base electrode.

The transistors T7, T8, and T9 form a difference amplifier similar to the transistors T4 and T5 except with three branches. The base of T7, T8, or T9 with the most negative voltage controls the signal current in the resistors coupled to the emitters of T7, T8, and T9. If the base of T7 is more negative than the voltages applied to the bases of T8 and T9, T7 will develop a signal voltage across its output resistor 104 on its collector. If the base of T8 or T9 is most negative, no voltage is developed across the resistor coupled to the collector of T7. If all the base voltages are the same or substantially the same, it is possible for T7, T8, and T9 to each conduct some signal current.

As indicated, the second difference amplifier comprises three branches, i.e., the transistors T7, T8, and T9, all of which have their emitters coupled together. Before the output signal from the first difference amplifier is applied to the second difference amplifier, it is inverted by a transistor T11 and amplified by a transistor stage T6 which is coupled in an emitter-follower arrangement to the bases of T7 and T8. The voltage developed across the collector resistor 54 of T4 is applied to the base of the inverter transistor T11. The emitter of T11 is connected to a negative voltage (e.g., —14 volts) through a resistor 66. The collector of T11 is connected to a positive voltage (e.g., +14 volts) through a resistor 68 and the voltage developed across the resistor 68 is applied to the base of the emitter follower transistor T6 through a capacitor 70. The capacitor 70 blocks the D.C. component from the base of T6 and permits only the A.C. component to pass. The base of T6 is connected to the positive potential through a resistor 72 and to ground through a resistor 74.

A negative potential is applied to the collector of T6 and a positive potential is applied to the emitter through a resistor 76. In parallel with the resistor 76 and connected between the emitter of T6 and ground is a resistor 78. The output from the emitter of T6 is connected to two of the transistors of the second difference amplifier, namely, the bases of T7 and T8. The signal from the emitter of T6 is coupled directly to the base of T7 through a capacitor 80 and also through a three-microsecond delay line and a series capacitor 84 to the base of T8. Thus, the delay line 82 and the capacitor 84 will cause the signal from T6 to be applied to the base of T8 somewhat later in time according to the delay of the delay circuit 82. In the particular embodiment which was constructed and described, the delay circuit 82 provided a delay of three microseconds with an impedance of 3900 ohms. The common point between the delay 82 and the capacitor 84 is connected to ground through a resistor 86.

As shown by the FIGURE 1, the base of T7 is coupled to a positive potential through a resistor 88 and to ground through a resistor 90. The base of T8 is connected to a positive potential through a series resistor 92 and the wiper arm of a potentiometer 94. The other end of the potentiometer 94 is connected to ground potential.

As noted earlier, the emitters of the transistors T7, T8, and T9, which comprise the second difference amplifier, are all coupled together. Also coupled to the emitters of T7, T8, and T9 are three parallel impedances: a first leg to ground through a series resistor 96 and capacitor 98; a second leg directly to ground through a resistor 100; and, a third leg to a positive potential through a resistor 102.

Since only a single output is desired from the second difference amplifier, the collector of T9 is connected to ground, the collector of T8 is coupled to a negative potential, and the signal from the second difference amplifier is derived across the resistor 104 which is in series with the collector of T7 and a minus or negative voltage (e.g., minus 14 volts), as shown. The output signal is derived at the output terminal 106.

As indicated earlier, the transistors T7, T8, and T9 form a difference amplifier similar to T4 and T5 except the second difference amplifier has three branches. The first difference amplifier was utilized to improve the leading edge of the waveform and the second difference amplifier is now utilized to improve the trailing edge of the waveform. Thus, the contrast control, by improvement of the waveform, will provide as much contrast between black and white signals as is practical; however, the circuit will preserve the gray areas, if such is desired, since the amplitude of the signals is, in most cases, unaffected by the circuit.

The base of T7, T8, and T9 with the most negative signal controls the signal current in the resistors 100 and 102. If the base of T7 is the most negative, T7 will develop a signal voltage across its collector resistor 104. If the base of T8 or T9 is the most negative, then no voltage is developed across the resistor 104. If all the base voltages are the same or close to the same, it is possible for T7, T8, and T9 to each conduct some signal current; however, the signal on the output conductor 106 would not be sufficient to indicate that a black sampling spot had been sampled in the scanning procedure. The output 106 may drive a Schmitt trigger or other means for processing video information.

In the particular circuit constructed and operated in accordance with the principles of this invention and with the voltages and type of transistors as shown, T7 would switch off as the base of T8 reaches approximately +3 volts. The waveform is reproduced as a substantially square wave with the sloping portion of the trailing edge removed.

The waveforms at the various points in the circuit will be discussed under the operation section of the specification.

The operation of T9 and T10 is similar to that as T7 and T8. Signal peaks on the base of T10 cause the peak negative voltages of the waveform to be stored on the capacitor 64. The voltage on the base of T9 controls the voltage at which T9 conducts. If the voltages on the bases of T8 and/or T9 become more negative than the voltage on the base of T7, then T7 switches off and no voltage is developed across its output resistor 104 and consequently no output signal at the output terminaal 106. If the base of T7 is more negative than T8 and/or T9, then the transistor T7 conducts according to the signal on its base. The capacitor storage circuit including the capacitor 64 is effective on smears longer than three microseconds and since the time constant is fairly long will also help to eliminate smudging between characters. That is to say, of a character being scanned is smudged or smudges or extraneous marks appear between characters, then the circuit comprising T9 and T10 takes over control of the second difference amplifier to improve the trailing edge of the waveform.

The delay lines 34 and 82 and associcated first and second difference amplifiers (which amplifiers may also be termed switches since they are utilized in this manner) are useful in reducing the tendency of horizontal bars to spread which prevents identification of the separate signals, i.e., the definition of the signal is diminished. These circuits operate on the leading and trailing edges of the horizontal bar video waveform as previously indicated.

The functions of the various circuits of the automatic contrast control of the present invention have been described but a detailed explanation will now be given with reference to the FIGURES 2 through 9, which figures give the waveforms at various points of the circuit of the FIGURE 1. It is to be understood, of course, that these waveforms represent the same signal as it is being operated upon by the circuit. The video pulse train of the FIGURE 2 containing the information pulses (of smaller amplitude than the beam blanking pulses) and the beam blanking pulses are applied to the base of the transistor T1. The diode 14 clamps the base of T1 to ground and the voltage excursions of the video train are from ground potential to various negative potential values. T1 is operated as an emitter-follower whose emitter is coupled through the resistor 18 to the collector of the beam blanking signal transistor T2. At the appropriate time, beam blanking signals are applied to the input 22 and the transistor T2 conducts so that the voltage developed across the resistor 18 contains only the video signal train (FIGURE 3) with the beam blanking pulses removed. The signal developed across the resistor 18 is then applied to the base of emitter-follower transistor T3 through the capacitor 26.

Figure 3:
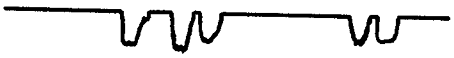
Figure 4:
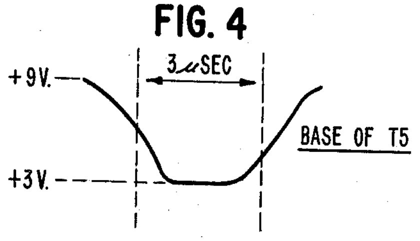

The waveform as applied to the base of T3 is substantially that as shown in the FIGURE 3. The signal developed on the emitter of T3 is in phase with its input base signal and is now applied to other elements of the circuit in three separate paths. One path is to the base of T5 (of the first difference amplifier) and to the level setting potentiometer 42, which potentiometer 42 has been adjusted as hereinbefore described. The signal applied to the base of T5 is that as shown in the FIGURE 4. The signal shown in the FIGURE 4, and the FIGURES 5 through 9, are enlarged views of one of the information pulses shown in the FIGURES 2 and 3. The signal from the emitter of T3 is also applied to the base of T4 of the first difference amplifier after a three-microsecond delay by the delay line 34. This waveform is as shown in the FIGURE 5. Due to the circuit elements, it will be noted that whereas the signal to the base of T5 varies between +3 volts and +9 volts, the signal applied to the base of T4 varies from +7 volts down to a value less than +3 volts. It will be recalled that the transistor of the pair of transistors T4 and T5 will conduct which has the most negative signal applied to its base.

The signal current through the resistors 46 and 48 is switched between T4 and T5 depending on which base is most negative. The base that is most negative causes that transistor to conduct. The signal current through the resistors 46 and 48 can be shared by T4 and T5 if neither base is sufficiently negative to completely control the emitter current. If the base of T5 is most negative, T4 will be turned off and no voltage will be developed across the resistor 54. If the signal at T4 is most negative a voltage depending on the signal is developed across the resistor 54. Accordingly, after the delay T4 has a more negative signal on its base than T5, T5 cuts off and T4 goes into conduction and produces a signal on its collector as shown in the FIGURE 6. Of course, the waveform has been inverted but the sloping leading edge has now been replaced with a substantially vertical rising leading edge which is applied out of phase to the transistor T7 of the second difference amplifier, through the inverter T11 and the emitter-follower T6.

It will be recalled that the second difference amplifier comprises the transistors T7, T8, and T9. As just indicated, the signal developed across the resistor 54 on the collector of T4 was applied to the base of T7. This waveform is a shown in the FIGURE 7 which has an excursion from approximately 7 volts positive down to 1 volt positive. In addition, the signal from the emitter of T6 is applied to the base of T8 through a three-microsecond delay line 82, and the waveform is that as shown in the FIGURE 8. It will be noted that the signal applied to the base of T7 is more negative than that applied to the base of T8. Also, the original signal from the emitter of T3 is applied to the third transistor T9 of the second difference amplifier through an emitter-follower transistor T10. Signal peaks on the base of T10 cause the peak negative voltages of the waveform to be stored on the capacitor 64. The voltage on the base of T9 as applied from the emitter of T10 controls the voltage at which T9 conducts. The transistors of the second difference amplifier operate in a manner similar to those of the first difference amplifier in that the transistor with the most negative signal will conduct while the remaining transistor or transistors will be turned off. That is to say, the base with the most negative voltage controls the signal current in the resistors 100 and 102.

Figure 7:
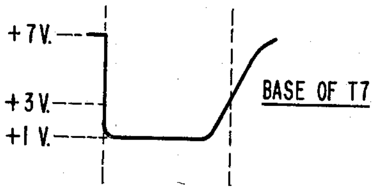
Figure 5:
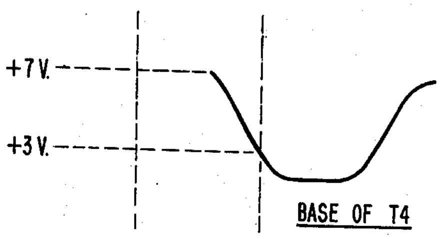
Figure 8:
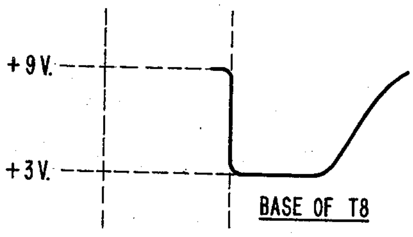
Figure 6:
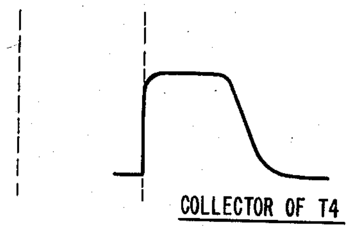
Figure 9:
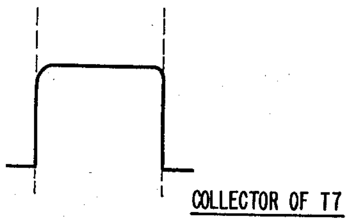

Reference to the FIGURE 7 (the waveform on the base of T7) and the FIGURE 8 (the waveform on the base of T8) will reveal that since the waveform on the base of T7 is more negative, T7 will control the output of the second difference amplifier and that the output developed on the collector of T7 for the trailing edge of the signal will assume on its trailing edge the leading edge of the signal on the base of T8 and produce a signal across the resistor 104, in series with the collector of T7, a waveform such as that shown at the FIGURE 9. Voltage peaks stored on the capacitor 64 help reduce fill-in on heavy characters and help also to reduce smudge effects between characters. By thus controlling the three transistors of the second difference amplifier, an improved voltage waveform was derived. In other words, if smudges appear, T9 will control and cause the rapid vertical rise (or fall) of the trailing edge, by ignoring extraneous small pulses following the trailing edge. It will be noted that due to the use of th three-miscrosecond delay lines 34 and 82, that the system improves the contrast by not operating on a pulse shorter than the three microseconds. In addition, the leading edge and the trailing edge of the input signal have been "squared up" so that a circuit coupled to the output terminal 106 (which circuit is not shown) may readily respond to this output pulse having a fast rise time and a fast fall time.

After operation of the circuit is observed, the potentiometers 42, 60, and 94 may be adjusted to the proper operating levels.

Thus, there has been described and shown on automatic contrast control circuit for use in character scanning techniques where the sampled areas or patterns were improved in definition. The leading and trailing edges of the signals have been sharply improved and the circuit operates on a continuing basis to provide a contrast control for each sweep of the scanning beam of the camera tube.

The present invention may be embodied in other specific forms without departing from the spirit and essential characteristics of the invention. The present embodiment is therefore to be considered in all respects as illustrative and the scope of the invention being indicated by the appended claims rather than the foregoing description, and all changes which come within the meaning and range of the equivalency of the claims are therefore intended to be embraced therein.

What is claimed is:

1. A circuit for improving the waveform of a pulse train comprising a first difference amplifier for receiving the original waveform, and the original waveform delayed in time, for decreasing the rise time of the waveform and a second difference amplifier coupled to receive the output waveform from the first difference amplifier and the waveform from the first difference amplifier delayed in time, for decreasing the fall time of the same waveform.

2. An automatic contrast circuit for receiving the output from a video amplier which video amplifier produces a video pulse train derived from scanning a field of visually identifiable characters containing information signals and blanking signals, the improvement comprising means for separating the information signals from the blanking signals, means for decreasing the rise time of the information signals, said last named means including a first amplifying stage for receiving the same signal both at zero time and at a time delayed from zero time, and means for decreasing the fall time of the same signal, said last named means including a second amplifying stage coupled to receive the output of said first amplifying stage and the output of said first amplifying stage delayed a predetermined time interval.

3. The circuit as defined in claim 2 wherein said first amplifier is a difference amplifier.

4. The circuit as defined in claim 2 wherein said second amplifier is a difference amplifier.

5. Means for decreasing the fall time of the trailing edge of a waveform, comprising an amplifier for receiving the waveform, a difference amplifier comprising a first, a second, and a third transistor, all of said transistors having their emitters connected in common and any one of which may control the output of said difference amplifier according to the signal applied, means to couple the output of said amplifier to said first transistor, means to delay the output of said amplifier for one predetermined time period and for a second time period greater than the one predetermined time period, means to apply said one time period delayed output to said second transistor, and means to apply said second time period delayed output to said third transistor, said second transistor producing an output according to the controlling transistor of said difference amplifier.

6. The combination as defined in claim 5 including means coupled to said first transistor for storing the peak value of the signal applied to said transistor.

7. Circuit means for decreasing the rise time of a waveform comprising an intercoupled first, second, and third transistor, means to apply the waveform to said first and said second transistor, charging means coupled to said second transistor, means to delay the original waveform, means to apply said delayed waveform to said third transistor, an output means coupled to said first transistor for deriving and output waveform as determined by said charging means of said second transistor and said delayed waveform from said third transistor.

8. Circuit means for improving the waveform of a video pulse train containing information and blanking signals, comprising means to remove said blanking signals from said pulse train, a first amplifier comprising a first and a second transistor having their emitters coupled in common, means for applying the information signal to the base of said first transistor, means for delaying the information signal, means to apply said delayed signal to the base of said second transistor for causing conduction of said transistor and inhibiting conduction in said first transistor, a second amplifier having a third, a fourth and a fifth transistor, said transistors of said second amplifier having their emitters coupled in common, means to derive an output from said second transistor, means to couple said output to the base of said third transistor, means to delay said output signal, means to couple said delayed output signal to the base of said fourth transistor, charging means coupled to receive the original information signal, said charging means coupled to the base of said fifth transistor, and output means coupled to the collector of said third transistor, said output determined by said fourth and said fifth transistors.

9. The combination as defined in claim 8 including an inverting amplifier coupled between said first and said second amplifiers.

10. Circuit means for receiving a waveform having a sloping trailing edge and producing a substantially square edge in place thereof comprising, a first, a second, and a third transistor, means coupling the emitters of said transistors in common, the transistor of said group of transistors conducting which has the most negative signal applied to its base, means to apply the waveform to the base of said first transistor to cause conduction thereof, means to apply the waveform to a charging circuit coupled to the base of said second transistor, means to delay the waveform, and means to apply the delayed waveform to the base of said third transistor, said second or said third transistors inhibiting the output from said first transistor as soon as the base of either of said second or said third transistors becomes more negative than the base of said first transistor.

References Cited by the Examiner

UNITED STATES PATENTS

| | | | |
|---|---|---|---|
| 3,007,055 | 10/61 | Herzfeld | 307—88.5 |
| 3,007,060 | 10/61 | Guenther | 307—88.5 |
| 3,027,421 | 3/62 | Heijligers | 178—7.5 |
| 3,073,972 | 1/63 | Jenkins | 307—88.5 |
| 3,104,281 | 9/63 | Wolff | 178—7.5 |

ARTHUR GAUSS, *Primary Examiner.*